(12) United States Patent
Davidson (10) Patent No.: US 11,686,562 B2
(45) Date of Patent: Jun. 27, 2023

(54) ARCHERY VANE

(71) Applicant: Kyle Davidson, Noblesville, IN (US)

(72) Inventor: Kyle Davidson, Noblesville, IN (US)

(*) Notice: Subject to any disclaimer, the term of this patent is extended or adjusted under 35 U.S.C. 154(b) by 0 days.

(21) Appl. No.: 17/581,396

(22) Filed: Jan. 21, 2022

(65) Prior Publication Data

US 2022/0236040 A1 Jul. 28, 2022

Related U.S. Application Data

(60) Provisional application No. 63/140,662, filed on Jan. 22, 2021.

(51) Int. Cl.
*F42B 6/06* (2006.01)
*F42B 10/04* (2006.01)

(52) U.S. Cl.
CPC .............. *F42B 6/06* (2013.01); *F42B 10/04* (2013.01)

(58) Field of Classification Search
CPC .......................................................... F42B 6/06
See application file for complete search history.

(56) References Cited

U.S. PATENT DOCUMENTS

| | | | | |
|---|---|---|---|---|
| 2,976,043 | A * | 3/1961 | Meyer | F42B 6/06 |
| | | | | 473/586 |
| 4,502,692 | A * | 3/1985 | Humphrey | F42B 6/06 |
| | | | | 473/586 |
| 4,615,552 | A * | 10/1986 | Bengtson | F42B 6/06 |
| | | | | 473/586 |
| 5,613,688 | A * | 3/1997 | Carella | F42B 10/26 |
| | | | | 473/586 |
| D606,615 | S | 12/2009 | Andrews | |
| D612,444 | S | 3/2010 | Klein | |
| 7,914,406 | B2 | 3/2011 | Andrews | |
| 8,025,596 | B2 | 9/2011 | Klein | |
| 8,323,133 | B1 * | 12/2012 | Middendorf | F42B 6/06 |
| | | | | 473/586 |
| 8,388,474 | B1 | 3/2013 | Griffith | |
| 8,602,926 | B2 | 12/2013 | Griffith | |
| 10,408,585 | B1 | 9/2019 | Potter et al. | |
| 2007/0173359 | A1 | 7/2007 | Mowery | |
| 2010/0311527 | A1 * | 12/2010 | Song | F42B 6/06 |
| | | | | 473/586 |
| 2015/0105193 | A1 | 4/2015 | Pendersen | |

* cited by examiner

*Primary Examiner* — John A Ricci (57) ABSTRACT

An aerodynamic element (often referred to as a vane or fletching) that is operatively coupled to the nock end (the back) of an arrow that adds significant stability associated with vanes of similar height (referred to as "high profile" in the archery community) without the noise (amplitude and frequency) commonly associated with such vanes while also providing low drag characteristics. The vane has an initial front or leading edge at a shallow initial angle relative to the axis of the arrow. When the vane is mounted at an angle (known as offset or helical) to the axis of the arrow, this front shallow initial angle (and area under it) is utilized as a vortex generator. This vortex mixes and therefore helps balance velocities in the lower pressure, large aft area which is initiated at a point along the leading edge that increases to a steeper angle relative to the initial angle. The top of the vane is parallel to the axis of the arrow for stability as well as sound advantages. The back edge of the vane then angles down at a steep angle in a straight line to help with noise as well as control airflow.

19 Claims, 6 Drawing Sheets

ARCHERY VANE

CROSS-REFERENCE TO RELATED APPLICATION

The present application claims priority to U.S. Provisional Patent Application Ser. No. 63/140,662, filed Jan. 22, 2021, the disclosure of which is expressly incorporated herein by reference.

BACKGROUND AND SUMMARY OF THE INVENTION

An arrow used for the sport of archery has evolved over the thousands of years archery has existed. In recent years, bows as well as arrow shafts have significantly improved in technology and construction methods leading to more consistent products. Now more focus is being given to the individual components and construction of complete arrow assemblies. These assemblies primarily consist of a point, an insert, an arrow shaft, vanes and a nock. Vanes, in particular, are aerodynamic elements operatively coupled in some way to the nock end (back) of an arrow shaft in some sort of polarity arrangement. Simply put, they are used to increase the stability of an arrow in flight. The ways of which this is achieved are discussed below. The present issue is that vanes currently available on the market that generate the most stability also cause a substantial amount of noise in both amplitude and high frequencies. The amplitude as well as higher frequency generated from current profiles leads to issues when (but not limited to) hunting. Animals will react to the noise and move (dodge, duck, dip or dive) before the arrow reaches its intended point of impact. This movement by the animal leads to missing shots or worse injuring or maiming the animal.

In flight, two points of an arrow are important for stability calculations. These points are also used for other projectiles of similar shape or function. Those points are (1) the center of gravity or alternately center of mass, and (2) the center of pressure or alternately the aerodynamic center. The center of gravity is where all of the weight or mass of a fully assembled arrow can be summed. It is also the point of rotation (angular acceleration) when the arrow is in flight, as well as other mechanical calculations including those with respect to momentum. The center of pressure (or alternately aerodynamic center) is the point where all of the aerodynamic pressures generated are summed. It can be demonstrated using an axis normal to the arrow's longitudinal axis that, in an evenly distributed crosswind (perpendicular to the arrow's axis), would result in a balanced, steady state and not rotate.

When an arrow is shot from a bow off axis to its intended flight path, or is in flight and its axis is not in line with the intended trajectory of the arrow, a normal force perpendicular to the flow of the fluid is generated and summed at the center of pressure. This force (also known as lift in the aerodynamic community) multiplied by the distance from the center of pressure to the center of gravity induces a torque around the center of gravity. This torque corrects the arrow, rotating it back into its intended flight path. This angle of flight relative to fluid flow is referred to as angle of attack, in more general aerodynamic terms. Therefore, it is desired to have the center of pressure closer to the nock end of an arrow. This is of particular importance in a hunting scenario when a fixed blade broadhead (of equal weight to the field point) is attached to the front of the arrow. A fixed blade broadhead consists of a point on an arrow that is surrounded by a plurality of blades (usually 2-4) that are fixed in an expanded position roughly 0.5-0.75" in height from the surface of the shaft used in hunting applications. Effectively the broadhead acts as an aerodynamic element (vane) on the front of an arrow. This increased area in the front of the arrow moves the center of pressure closer to the center of gravity (away from the nock end). This greatly reduces the effective torque derived from the center of pressure. The larger the area of a broadhead, or increasing the number of blades on the broadhead, the more the distance from the center of gravity to the center of pressure is reduce, and therefore decreasing stability. This is of even more importance the shorter the arrow is.

Currently a term discussed in the archery community is the front of center (or FOC). The front of center is a percentage calculated by subtracting the distance from the back of the arrow to the center of gravity minus half the length of the arrow divided by the total length of the arrow. This dimension has little to do with the reality of arrow flight because the measured center of the arrow has nothing to do with the flight characteristics. A more accurate way to quantify stability is to use a measurement from the center of gravity to the center of pressure (or aerodynamic center), as mentioned above. It also better takes into account the overall length of the arrow (long vs short).

Current vanes on the market classified by the archery community as "high profile" (with a height of approximately 0.500" or greater) and short in length (approximately 2.00-2.5") generate significant noise as measured in amplitude and frequency. Conversely, current vanes classified by the archery community as "low profile" (with a height of approximately 0.500" and less) and longer in length (approximately 2.75" or greater) tend to (but not always) produce less noise at a lower frequency. A high profile, shorter vane stabilizes an arrow better than a low profile, longer vane, particularly in, but not limited to, hunting situations. This is accomplished by multiple means. A high profile, shorter vane has a component center of pressure further towards the back, which more effectively moves the center of pressure of the fully assembled arrow to the nock end (back) of the arrow. The current embodiment accomplishes this by having a component center of pressure positioned near the back or distal end of the vane. This is attained by having a large surface area in the back of the vane and a shallow lead area in the front of the vane. The high profile also allows the vane to extend into higher velocity air outside of the boundary layer (the region defined by the slower moving fluid closer to the surface), or even the separation bubble (developed with long cylinders) surrounding the shaft of the arrow, therefore allowing it to more effectively and efficiently generate gyroscopic rotation. A longer vane normally has a component center of pressure located a greater distance from the back of its profile than a shorter vane's profile. As the components' center of pressure approach each other, there is a point of diminishing returns in the ability to move the total assembly center of pressure. This effect also leads to longer vane profiles being less stable than a high-profile shorter vane's profile.

The problem with noise generated by high profile (>0.500") vanes is that it will alert an animal being shot at, before the arrow reaches the target. Animals have been commonly known to either duck, jump or otherwise dodge an arrow when loud, high frequency sounds are detected. This has been seen and demonstrated by very experienced hunters. This leads to either missing the animal or worse injuring the animal, instead of a quick, ethical harvest of the animal.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description of exemplary embodiments when taken in conjunction with the accompanying drawings, wherein.

Corresponding reference characters indicate corresponding parts throughout the several views. Although the drawings represent exemplary embodiments of the various features and components according to the present disclosure, the drawings are not necessarily to scale and certain features may be exaggerated in order to better illustrate exemplary embodiments of the invention, and such exemplifications are not to be construed as limiting the scope of the invention in any manner.

DETAILED DESCRIPTION OF THE DRAWINGS

The illustrative embodiment vane 100 reduces noise as measured in both amplitude and frequency by utilizing at least 2 front or leading edges that progressively increase in angle from the front of the vane 100 (FIG. 1A) to the highest point of the vane 100. This has been developed using computational fluid dynamics, field test data (including sound data as well as a Doppler radar system), center of pressure calculations and wind tunnel testing. A first leading edge, 112 (FIG. 1A), of approximately 15+/−5 degrees (A2, FIG. 1B) is followed by a second leading edge 113 (FIG. 1A) of approximately 32.5+/−5 degrees (A3, FIG. 1B). Current high profile, short vanes (as defined earlier) with a relatively steep initial leading edge (approximately 30 degrees) relative to any other subsequent front edges of the vane typically generate excessive noise as measured in both amplitude and frequency. This is audible to the human ear or using a simple microphone and has been demonstrated publicly many times.

Figure 5A:
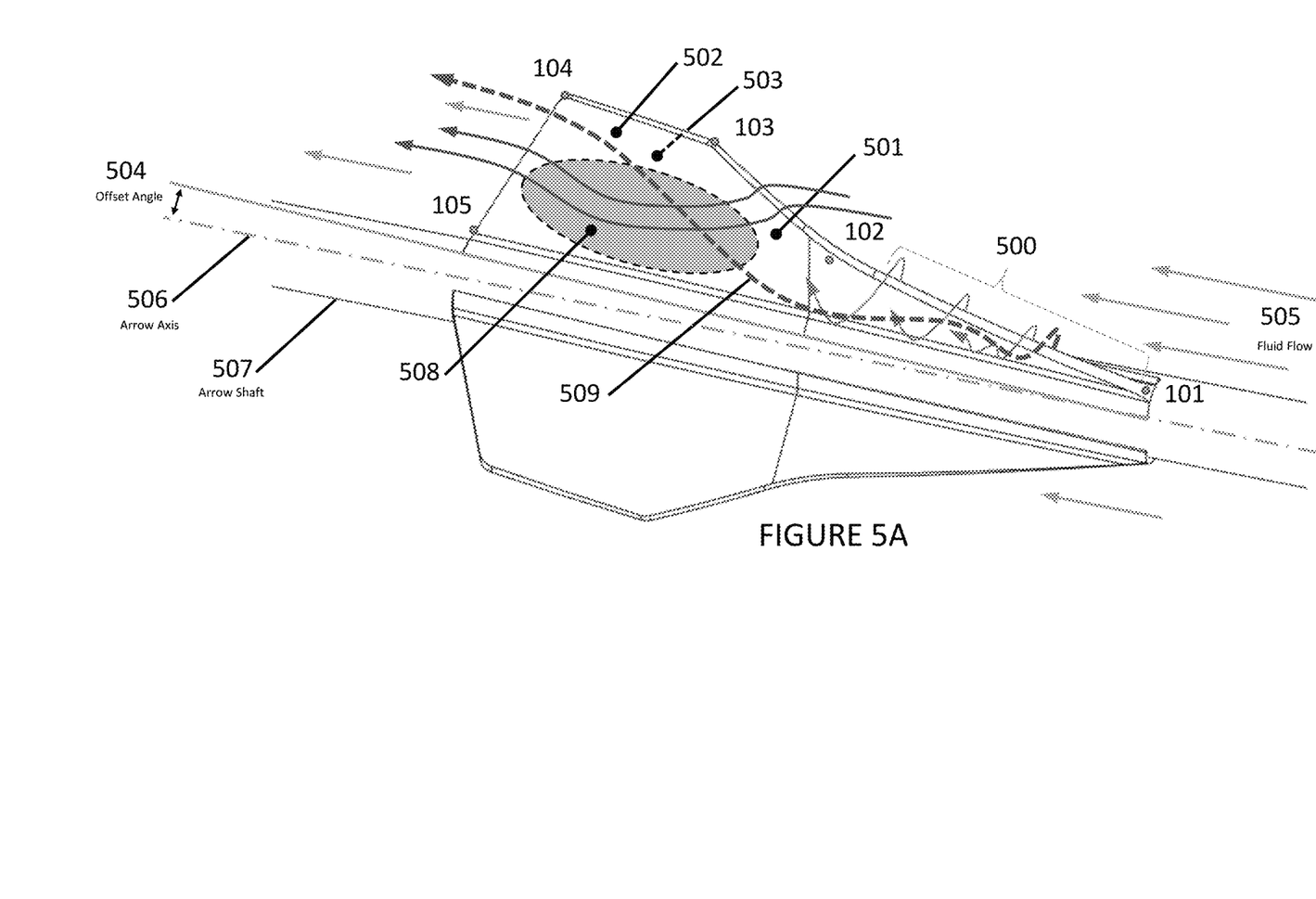
FIG. 5A is an illustration of an isometric view of illustrative vane 100 shown operatively coupled to the back of an arrow with 2.5 degrees of offset relative to the axis of an arrow illustrating the fluid flow.

The illustrative embodiment vane 100 reduces this noise amplitude and frequency by utilizing the initial leading edge, 112 (FIG. 1A) and the area under it as a vortex generator. This is accomplished by using the pressure imbalance on surfaces 503 (FIG. 5A, B, C), being high pressure, and 502 (FIG. 5A, B, C), being relatively low pressure which is a result of the vane being operatively coupled to the arrow at an offset angle, 504 (FIG. 5A, B, C) of approximately 2.5 degrees to the arrow axis, 506 (FIG. 5A, B, C) and therefor direction of fluid flow, 505 (FIG. 5A, B, C). These vortices, 500 (FIG. 5A, B, C) then traverse initial lead edge, 112 (FIG. 1A), until they meet the subsequent, relatively steep angle (A3, FIG. 1B) of the second leading edge 113 (FIG. 1A) of the vane 100. At which point (501, FIG. 5A, B, C), the vortices move behind edge 113 (FIG. 1A) of the vane 100, mixing the slow velocity of the fluid close to the surface and high velocity of fluids further away from the surface (508, FIG. 5A, B, C), which keeps the fluid flow attached to surface 502 (FIG. 5A, B, C). This mixing of fluid velocities creates less of a velocity difference between the two sides 502, 503 (FIG. 5A, B, C) of the vane 100. This velocity balance results in a reduction of the vortex generated at the trailing edge 108 of the vane 100, which is known to generate a high frequency "hissing" or "sizzling" sound associated with vortex shedding in current vanes on the market.

According to this illustrative embodiment, the height of the back of the first leading edge 112, shown at 102 (FIG. 1A) and represented by linear dimension D7 (FIG. 1B), has been tuned to balance both the noise reduction benefits as well as reduce the drag associated with the low-pressure wake as mentioned earlier. After the initial leading edge 112 (FIG. 1A) in the illustrative embodiment, the second segment of the leading edge 113 (FIG. 1A) steepens to an angle of approximately 35 degrees (A3, FIG. 1B). The length of the flat section on top of the profile, 109 (FIG. 1A), has been optimized to increase the vane's component center of pressure, 115 (FIG. 1A), as well as moving the center of pressure to the back of the vane 100. The larger area has also been shown to be optimal for deflecting the flow of fluid, when operatively coupled to the shaft in an offset or helical fashion generating gyroscopic stability. These linear segments have shown to be the optimal solution, but in another iteration could be concave, convex or have another segment or segment(s) as well as the variations shown in FIG. 6.

The illustrative embodiment, as well as features and aspects thereof, are aimed at providing a vane 100 that achieves optimal stabilization of an arrow or similar projectile as described earlier, while also having key design elements that are important for decreasing sound and drag generated by aerodynamic forces, vortex shedding and low pressure wakes and optimizing the location of the component's center of pressure. This vane can be used in any archery environment, multiple configurations, offset (or helical) and with any type of arrow shaft. Because of this it has been shown to decrease the difference seen while shooting a field point, mechanical deploying broadhead or fixed blade broadhead.

The illustrative embodiment has characteristics that both reduce sound (amplitude and frequency) as well as increases all of the beneficial characteristics described earlier of a tall profile vane (e.g. optimal center of pressure, increased gyroscopic rotation, extending into higher velocity fluid flow, reducing trailing vortices). The material used for the profile of the illustrative embodiment should be constructed of a rigid enough material, illustratively urethane or TPU based compounds of the type commonly used in current existing vane construction that will adequately maintain shape at high velocities (300+ fps), but pliable enough to be easily applied in an offset configuration allowing for adequate adhesion of the base of the vane to a projectile's (arrow, bolt or similar) shaft, wrap, etc.

Figure 1A:
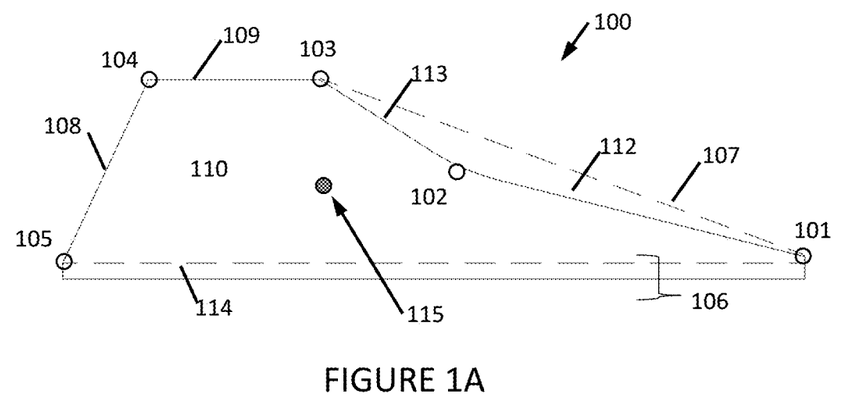
FIG. 1A is an illustration of the profile of vane 100 showing associative line segments (edges), points, base of vane and component center of pressure.
Figure 2A:
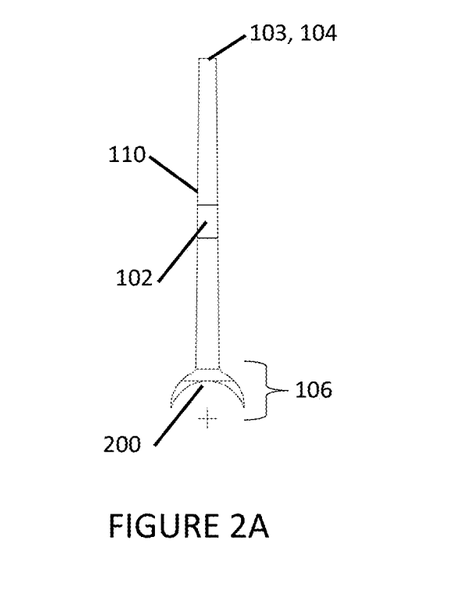
FIG. 2A is a section view of the illustrative vane 100 with associative points and surfaces.

With reference to FIG. 1A, the profile or side view of the illustrative vane 100 is shown in an unassembled state. The vane 100 includes a planer portion 110 (FIG. 1A) that has some thickness as well as the "foot" or vane base 106 (FIG. 1A, 2A). The vane base 106 (FIG. 1A, 2A) is used to provide a curved, large surface area, 200 (FIG. 2A), to operatively couple the vane 100 (FIG. 1A) to a mating, round surface such as that of arrow shaft 507 (FIG. 5 A, B, C) or similar projectile's outer diameter. This profile can be, but is not limited to, being: molded, laser cut, die cut, waterjet, 3D printed, cut with scissors or shears, or another manufacturing method. The illustrative embodiment is not limited to only straight lines as in this description but could also be related to both concave and convex segments joining the described points 101, 102, 103, 104 and 105 (FIG. 1A). Alternately, the illustrative embodiment in FIG. 1A shows one point (102) between points 101 and 103. This could also be increased to any number of points, including infinite points resulting in a curve. All of which would be still contained under a theoretical straight line from the leading point 101 (FIG. 1A) to the highest point on the profile (103 FIG. 1A in this illustration). The corners are shown to be sharp (except for the radius at point 102), but they could also be, in another iteration, rounded, filleted and/or chamfered.

Figure 1B:
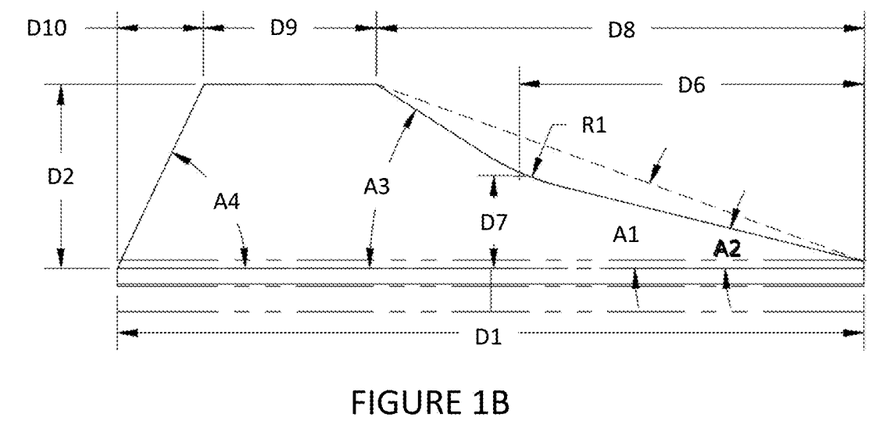
FIG. 1B is a profile view of the illustrative vane 100 showing associative linear, radial and angular dimensions.

The shape of profile 100 (FIG. 1A) is defined by, point 101 defined as the "front" of the vane 100. This point 101 is the front point of the leading edge 112 of the vane 100. The full leading edge of the vane 100 is further defined as segment 112, point 102, segment 113 and point 103. Segment 112 is made of point 101 and sharp corner 102 developed from the extended intersections of segments 112 and 113 shown as point 102. Segment 112 is defined as having an acute angular measurement A2 (FIG. 1B) that is less than the angular measurement A3 (FIG. 1B) formed by segment 113 (defined by points 102 and 103) both with respect to edge 114 which is where the vane 100 will operatively be coupled to the projectile and mostly horizontal in this depiction. Segment 107 is shown to demonstrate a straight reference segment from points 101 to 103, emphasizing the relative shape created by leading edge segments 112 and 113, and also demonstrating that point 102 will always be contained by angle A1 (FIG. 1B) or otherwise under or below segment 107 (FIG. 1A). This shape is only possible if segment 112's angle A2 (FIG. 1B) is less than segment 113's angle A3 (FIG. 1B). Segment 109 is defined by points 103 and 104. Segment 109 is also defined as linear and parallel with respect to segment 114. Point 103 and 104 are, by that definition the same height from segment 114. In another iteration they may not be, forming an angle with point 104 higher or lower than 103 with respect to segment 114. Segment 108 is defined by points 104 and 105. Point 105 is the nock end or "back" of the vane which is closest to the nock of the arrow. In this iteration the point 104 is further forward from point 105 and forms straight segment 108 that is illustratively shown as angular measurement A4 (FIG. 1B). This segment 108 as mentioned earlier can be concave or convex as with all of the other segments making up profile of vane 100. In this case, segment 108 could also be a plurality of different shapes. Computer simulations, field testing and wind tunnel simulations have shown this profile (100) to currently be an optimal shape.

FIG. 1B shows dimensions added to FIG. 1A to better elaborate on the description of the geometry. As seen length D1 (FIG. 1B) is illustratively greater than height D2, with D2 having a value, in this iteration, greater than 0.500". This profile's aerodynamic advantages can be applied to vanes less than 0.500" tall so it's claims should not be limited to profiles greater than 0.500". Such as a case where broadheads will never be used in the projectile's full assembly, such as: target archery, 3D archery, field archery or other similar activity. The length D1 is also illustratively greater than 1.5" but shorter than 2.75". Again, the advantages of having angle A2 is less than angle A3, where angle A3 is also greater than angle A1 are applicable for any vane of any size and will still have aerodynamic advantages in stability, drag and noise (amplitude and frequency). Illustrated value D9 shows the length of the top "flat" section 109. This dimension D9 has also been manipulated to balance both stability advantages with noise with respect to angles A3 and A2, in effect maximizing the components center of pressure of the vane 100. It also moves the vane 100 component center of pressure (115) up with respect the base 114 of the vane 100 to increase the moment arm measured from the axis of the arrow to said center of pressure, in effect increasing the torque generated by the fluid flow. This increases the gyroscopic stabilization force as well as decreasing the "spin up time" stabilizing the arrow faster and better. Spin up time is defined as the time between when the arrow is shot and the time it has reached a somewhat stable rotation rate.

Figure 2B:
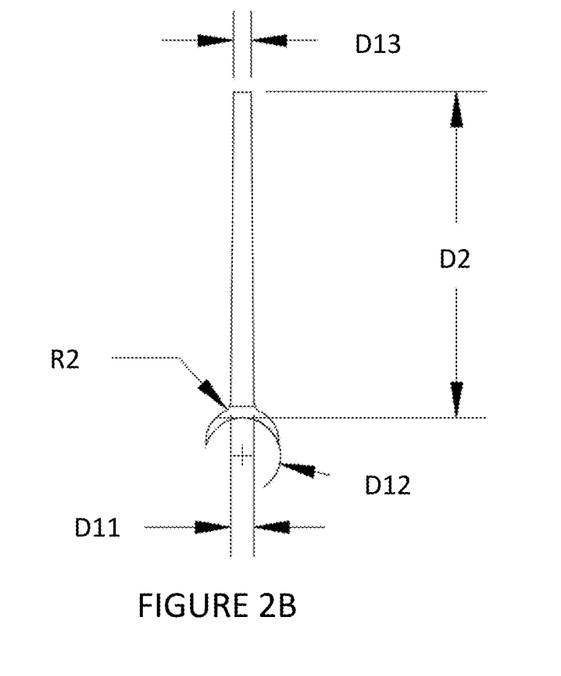
FIG. 2B is a section view of illustrative vane 100 with associative linear, diametrical and radial dimensions.

FIG. 2A shows the front view which is the section of the vane 100 (FIG. 1A) as it would look with 0 degrees of offset and viewed from the front of the arrow to the nock (back). This shape could be extruded, molded or other manufacturing method. This view shows the segment profile in thickness, in this embodiment the section displayed shows the section with a thicker base (D11, FIG. 2B) extending upward from base (106) to segment (109) as shown in FIG. 2B, D13 as well as a round R2 joining the base to the profile. Adding a round R2 to this section has been shown in aircraft as well as model rocketry to decrease drag to some degree. The round at the base as well as the slight taper of the section also helps to control the deformation of the vane by spreading out the load and not forming a stress concentration leading to the deformation of the section should the vane 100 be stored in such a manner that the vanes have some force acting on them (in a quiver, on a table, stored in a case, etc.). FIG. 2A also demonstrates the geometry of the base 106 that is shaped to give adequate surface area, 200 (FIG. 2A) to bond to the projectile (arrow shaft, wrap, bolt or other).

FIG. 2B shows the front view of the vane 100 (FIG. 1A) as well with dimensions added to better describe the geometry. In this view D2 is shown as the height of the vane 100 (FIG. 1A). D12 shows the diametrical dimension that is less than the smallest outer diameter shafts currently on the market. This helps to operatively couple the vane 100 (FIG.

1A) to the mating surface in the final assembly state when, but not limited to, using a bonding agent whose strength is based on surface area.

Figure 3A:
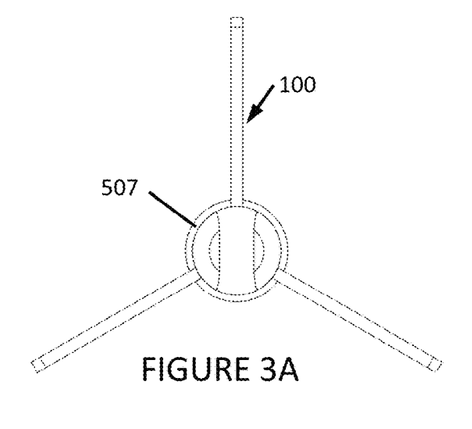
FIG. 3A is of an arrow assembly showing the illustrative vane 100 in an equally spaced 3-vane configuration with 0 degrees offset relative to the axis of an arrow.
Figure 3B:
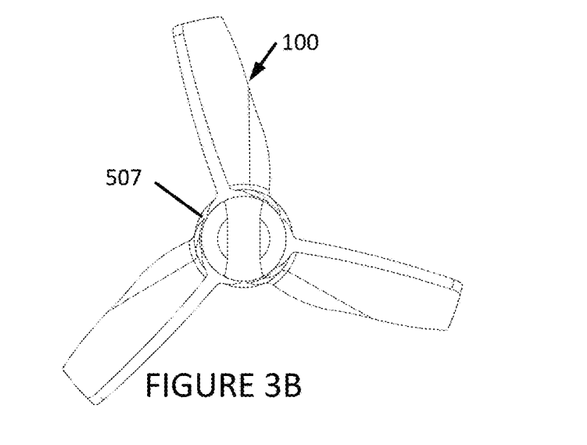
FIG. 3B is a rear view of the arrow assembly showing the illustrative vane 100 in an equally spaced 3-vane configuration with 2.5 degrees of offset relative to the axis of an arrow.

FIG. 3A Shows the vane 100 (FIG. 1A) in the illustrative embodiment mounted in an evenly spaced 3-vane configuration, separated by 120 degrees, with 0 degrees offset for illustration purposes only. Though this is not the only configuration for this vane. In practical application these vanes were tested to optimally be placed on an arrow with an offset of 2.5 degrees in a 3-vane configuration as shown in FIG. 3B. Other options are available (3, 4 or even 6 configurations at any offset angle) and easily done with multiple tools used for accurately affixing vanes to a shaft. Including the Vane Angle Tool sold by DCA Custom Arrows LLC used to setup a commonly used fletching jig so that the vane angle can be very accurately set.

Figure 4A:
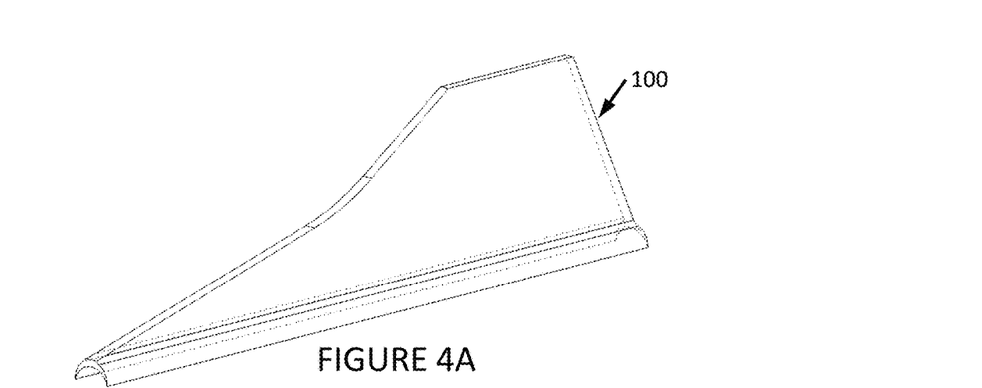
FIG. 4A is an isometric view of the illustrative vane 100.

FIG. 4A shows the vane 100 in an isometric view for visualization purposes.

Figure 4B:
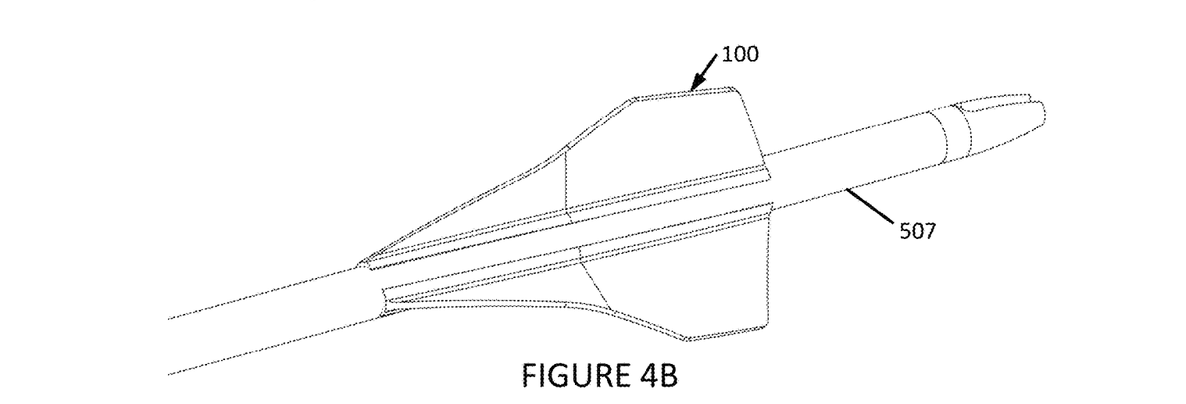
FIG. 4b is an isometric view of illustrative vane 100 shown operatively coupled to the back of an arrow in an equally spaced 3-vane configuration with 2.5 degrees of offset relative to the axis of an arrow.

FIG. 4B shows the vane 100 in an isometric view operatively coupled to an arrow shaft in a 3-vane configuration with a 2.5-degree offset.

FIG. 5A shows the vane 100 in an isometric view operatively coupled to an arrow shaft in a 3-vane configuration with a 2.5-degree offset. With flow lines added that have been demonstrated in a computational fluid dynamics software.

Figure 5B:
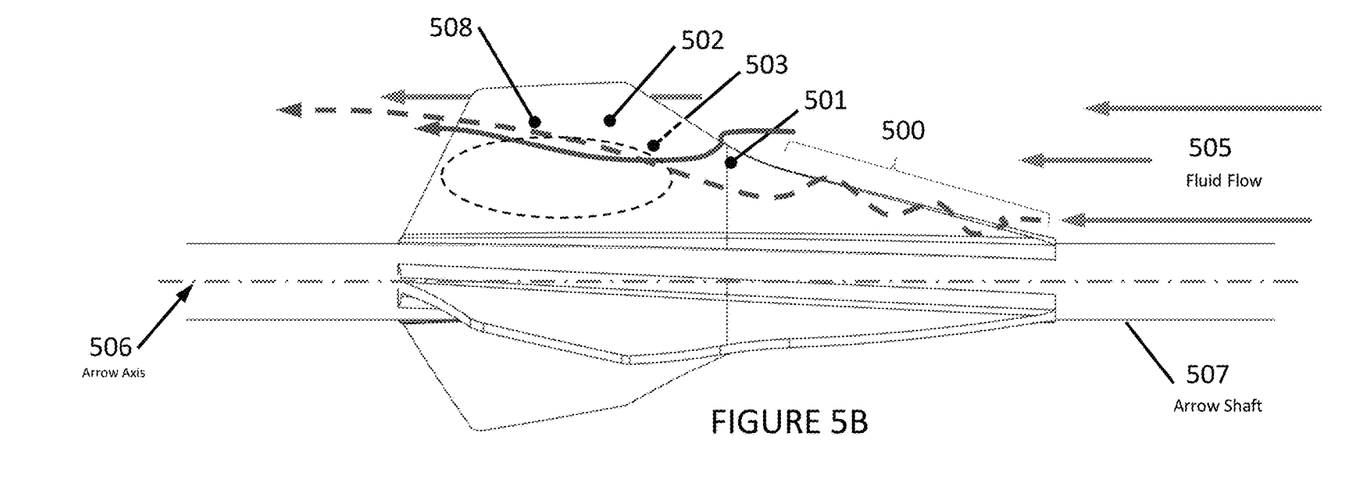
FIG. 5B is an illustration of the side view of illustrative vane 100 shown operatively coupled to the back of an arrow with 2.5 degrees of offset relative to the axis of an arrow illustrating the fluid flow.

FIG. 5B shows the vane 100 in an profile view operatively coupled to an arrow shaft in a 3-vane configuration with a 2.5-degree offset. With flow lines added that have been demonstrated in a computational fluid dynamics software.

Figure 5C:
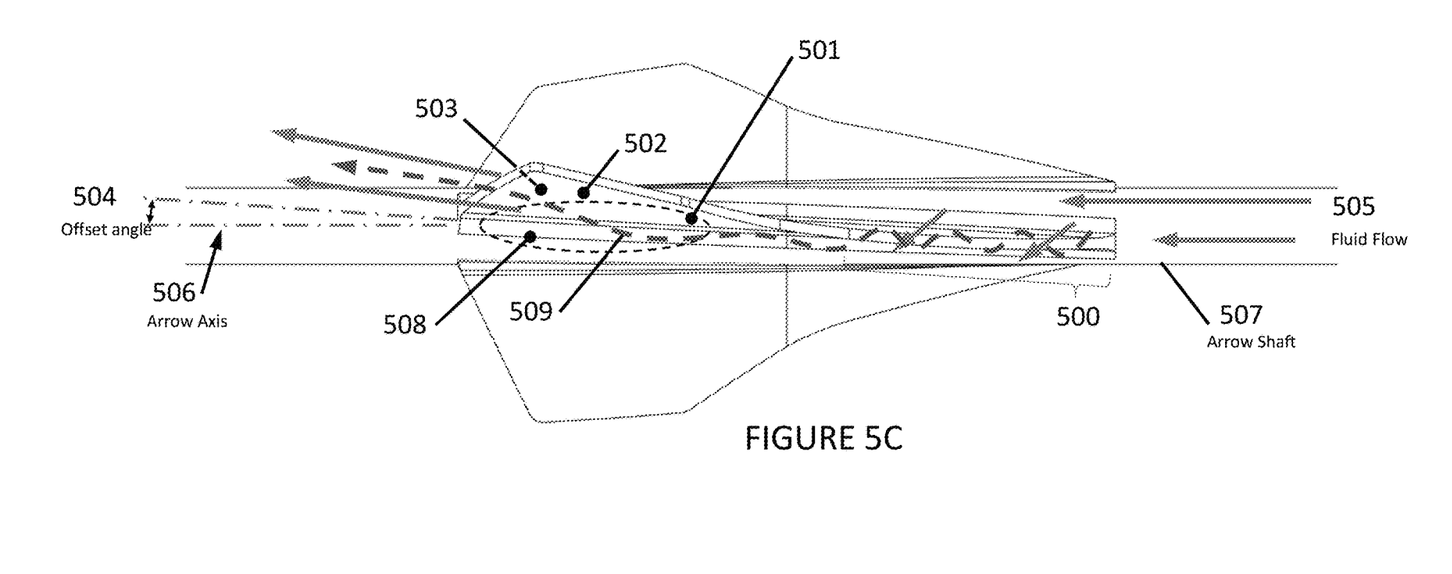
FIG. 5C is an illustration of the top view of illustrative vane 100 shown operatively coupled to the back of an arrow with 2.5 degrees of offset relative to the axis of an arrow illustrating the fluid flow.

FIG. 5C shows the vane 100 in an Top view operatively coupled to an arrow shaft in a 3-vane configuration with a 2.5-degree offset. With flow lines added that have been demonstrated in a computational fluid dynamics software.

Figure 6A:
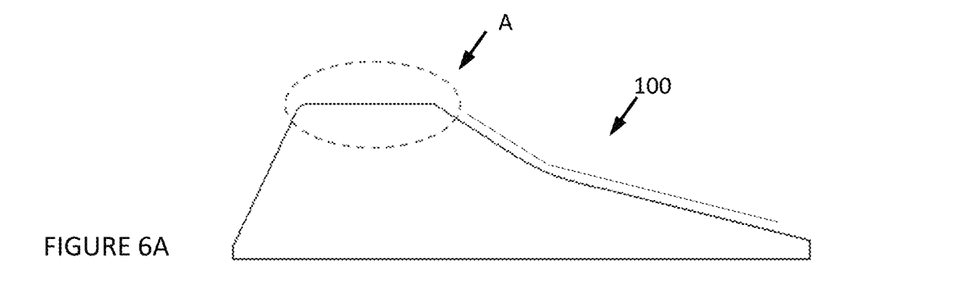
FIGS. 6A-6E are illustrations of the side view of possible variations of the illustrative embodiment.

FIG. 6A shows an alternate embodiment of vane 100 in a profile view showing radius added in the top corner as represented in detailed callout A.

Figure 6B:
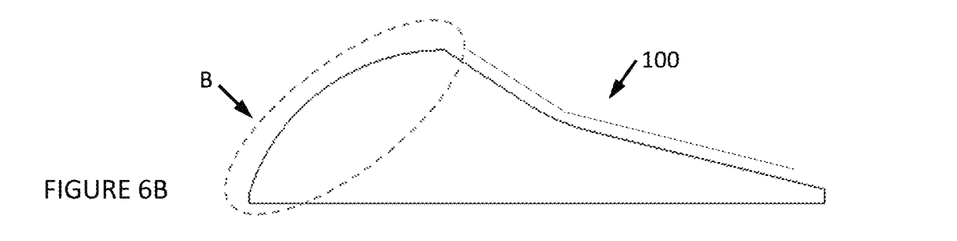

FIG. 6B shows an alternate embodiment of vane 100 in a profile view showing a parabolic back segment as represented in detailed callout B.

Figure 6C:
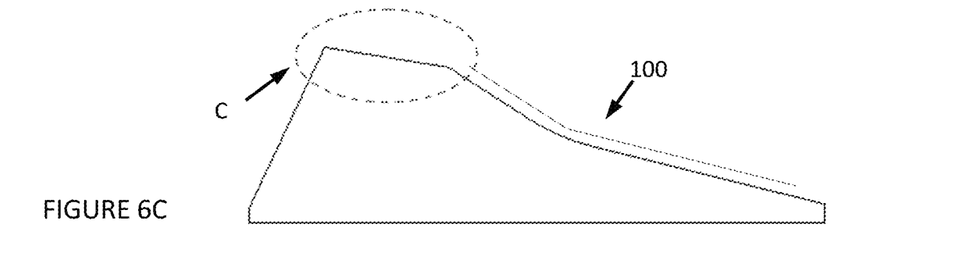

FIG. 6C shows an alternate embodiment of vane 100 in a profile view showing and angled top segment as represented in detailed callout C.

Figure 6D:
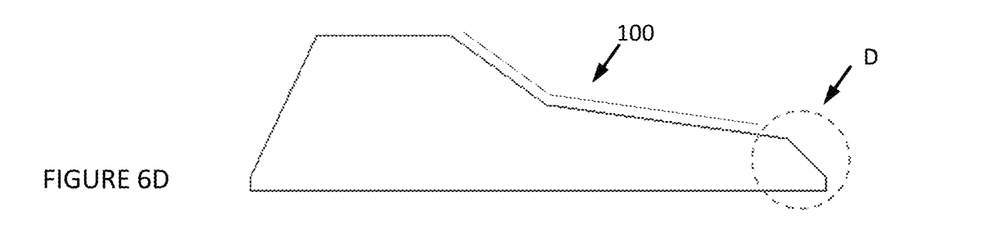

FIG. 6D shows an alternate embodiment of vane 100 in a profile view showing a steeper lead angle before the shallow lead angle as represented in detailed callout D.

Figure 6E:
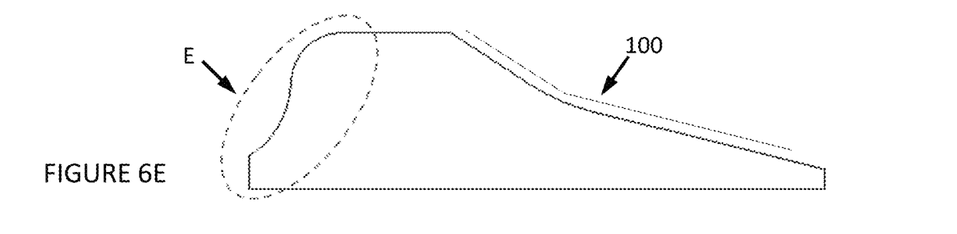

FIG. 6E shows an alternate embodiment of vane 100 in a profile view showing a "shield cut" as the back segment. Which is a rounded top segment followed by a concave cut then a vertical segment as represented in detailed callout E, the illustrative back segment.

Although the invention has been described in detail with reference to certain preferred embodiments, variations and modifications exist within the spirt and scope of the invention as described and defined in the following claims.

The invention claimed is:

1. An aerodynamic element configured to improve a component center of pressure, rotational stability, reduce a low pressure developed when mounted in an offset or helical position relative to a longitudinal axis of a projectile, mounted in a plurality, that also reduces trailing edge vortices that generate sound in both amplitude and frequency, the aerodynamic element having a base geometry suitable to be operatively coupled to the outer diameter of the projectile, the aerodynamic element further having a profile above the base geometry defined with a thickness and having a height H and a length L, the height H and the length L having a ratio of approximately 1:4; wherein:
the profile includes an initial leading edge followed by a subsequent leading edge, and a top edge, wherein the initial leading edge initiates at a frontmost point or base in which the angle of the initial leading edge measured relative to the base of the profile is less than an angle of a theoretical line connecting the frontmost point of the profile to the tallest point of the profile of the element;
the subsequent leading edge having at least one segment or edge in which the angle measured relative to the base of the profile is greater than that of an angle of the theoretical line connecting the frontmost point of the profile to the tallest point of the profile of the element;
the top edge having at least two points that develop a top segment or edge that are substantially parallel to the base of the profile of the element; and
a trailing edge includes at least two points extending from the tallest point of the profile to the base.

2. The aerodynamic element of claim 1, wherein the top most point of the trailing edge is forward of the lower point of the profile to the base.

3. The aerodynamic element of claim 1, wherein the height is defined as between 0.500 inches-0.600 inches, and the length is defined as between 2.0 inches-3 inches.

4. The aerodynamic element of claim 1, wherein the initial leading edge initiating at the frontmost point of the vane is linear at an angle of 15 degrees+/−5 degrees relative to the base.

5. The aerodynamic element of claim 1, wherein the height of the initial leading edge extends to a height of between 0.200 inches-0.300 inches.

6. The aerodynamic element of claim 1, wherein the subsequent leading edge is between 32.5 degrees+/−5 degrees relative to the base.

7. The aerodynamic element of claim 1, wherein the top segment is defined as approximately parallel to the base extending 0.350 inches-0.600 inches above base.

8. The aerodynamic element of claim 1, wherein the trailing edge is defined as a segment angled relative to the base by 65 degrees+/−5 degrees.

9. The aerodynamic element of claim 1, wherein the projectile comprises an arrow shaft, and the aerodynamic element comprises a vane or fletching.

10. An aerodynamic element including a main element with a continuous profile, when operatively coupled to a projectile at an angle to a longitudinal axis of the projectile and therefore at an angle to the direction of flow of fluid, presents a leading edge having a shallow angle relative to the projectile followed by a steep angle relative to the projectile, the shallow angle being less than the steep angle, still in the plane of the main element that acts as a vortex generator which creates a vortex that travels down a low pressure side of a larger, main trailing area of the aerodynamic element mixing slower and faster moving fluids thereby reducing a pressure difference between a high pressure side and an opposing low pressure side of the element which reduces vortices off the trailing area created from the fluid attempting to travel from the high pressure side to the lower pressure side, along with the noise amplitude and high frequencies associated with vortex shedding.

11. The aerodynamic element of claim 10, wherein the continuous profile further includes a trailing edge, a top most point of the trailing edge is forward of a lower point of the trailing edge.

12. The aerodynamic element of claim 10, wherein the continuous profile further includes a height and a length, the height is defined as between 0.500 inches-0.600 inches, and the length is defined as between 2.0 inches-3.0 inches.

13. The aerodynamic element of claim 10, wherein the leading edge includes an initial leading edge, the initial leading edge initiating at the frontmost point of the vane is linear at an angle of 15 degrees+/−5 degrees relative to the base.

14. The aerodynamic element of claim 13, wherein a height of the initial leading edge extends to a height of between 0.200 inches-0.300 inches.

15. The aerodynamic element of claim 13, wherein the leading edge includes a subsequent leading edge following the initial leading edge, the subsequent leading edge is between 32.5 degrees+/−5 degrees relative to the base.

16. The aerodynamic element of claim 10, wherein the top segment is defined as parallel to the base extending between 0.350 inches-0.600 inches above the base.

17. The aerodynamic element of claim 10, wherein the continuous profile further includes a leading edge, the trailing edge is defined as a segment angled relative to the base by 65 degrees+/−5 degrees.

18. The aerodynamic element of claim 10, wherein the projectile comprises an arrow shaft, and the aerodynamic element comprises a vane or fletching.

19. A projectile with a plurality of aerodynamic elements operatively coupled to a projectile, each aerodynamic element configured to improve a component center of pressure, rotational stability, reduce a low pressure developed when mounted in an offset or helical position relative to a longitudinal axis of the projectile that also reduces trailing edge vortices that generate sound in both amplitude and frequency, the aerodynamic element having a base geometry suitable to be operatively coupled to the outer diameter of the projectile, a profile above the base geometry defined with some thickness and having a height H and a length L, the height H and the length L having a ratio of approximately 1:4;

wherein:
   the profile includes an initial leading edge followed by a subsequent leading edge, and a top edge, wherein the initial leading edge initiates at the frontmost point or base in which the angle of the initial leading edge measured relative to the base of the profile is less than the angle of a theoretical line connecting the frontmost point of the profile to the tallest point of the profile of the element;
   the subsequent leading edge having at least one segment or edge in which the angle measured relative to the base of the profile is greater than that of an angle of the theoretical line connecting the frontmost point of the profile to the tallest point of the profile of the element;
   the top edge having at least two points that develop a top segment or edge that are substantially parallel to the base of the profile of the element; and
   a trailing edge includes at least 2 points extending from the tallest point of the profile to the base.

* * * * *